United States Patent [19]

Iori

[11] Patent Number: 5,056,576
[45] Date of Patent: Oct. 15, 1991

[54] APPARATUS FOR QUICKLY POSITIONING A TUBE TIRE ON A CORRESPONDING WHEEL RIM

[75] Inventor: Werter Iori, Reggio Emilia, Italy
[73] Assignee: Werther International S.r.l., Italy
[21] Appl. No.: 545,053
[22] Filed: Jun. 28, 1990

[30] Foreign Application Priority Data

Jul. 21, 1989 [IT] Italy .................. 46862 A/89

[51] Int. Cl.$^5$ .................................. B60C 25/12
[52] U.S. Cl. ...................... 157/1.17; 157/1.1
[58] Field of Search .................. 157/1.1, 1.17

[56] References Cited

U.S. PATENT DOCUMENTS

| | | | |
|---|---|---|---|
| 3,866,654 | 2/1975 | Duquesne | 157/1.1 |
| 4,061,173 | 12/1977 | Daly | 157/1.17 |
| 4,744,402 | 5/1988 | St.-Hilaire | 157/1.1 |
| 4,804,029 | 2/1989 | Glogovsky | 157/1.1 |

Primary Examiner—James G. Smith
Attorney, Agent, or Firm—Steinberg & Raskin

[57] ABSTRACT

An apparatus for quickly positioning a tubeless tire on a corresponding wheel rim includes a retractable nozzle associated with a valve member mobile in a substantially cylindrical chamber under the action of compressed air and against another predetermined pressure lower than that pressure which causes its movement, this valve member opening at the end of its movement in the chamber to enable said air to reach this nozzle, the cylindrical chamber being connected to a vessel containing a predetermined quantity of air at the higher pressure, between this chamber and the vessel there being provided valve means preferably operated by a pedal.

6 Claims, 1 Drawing Sheet

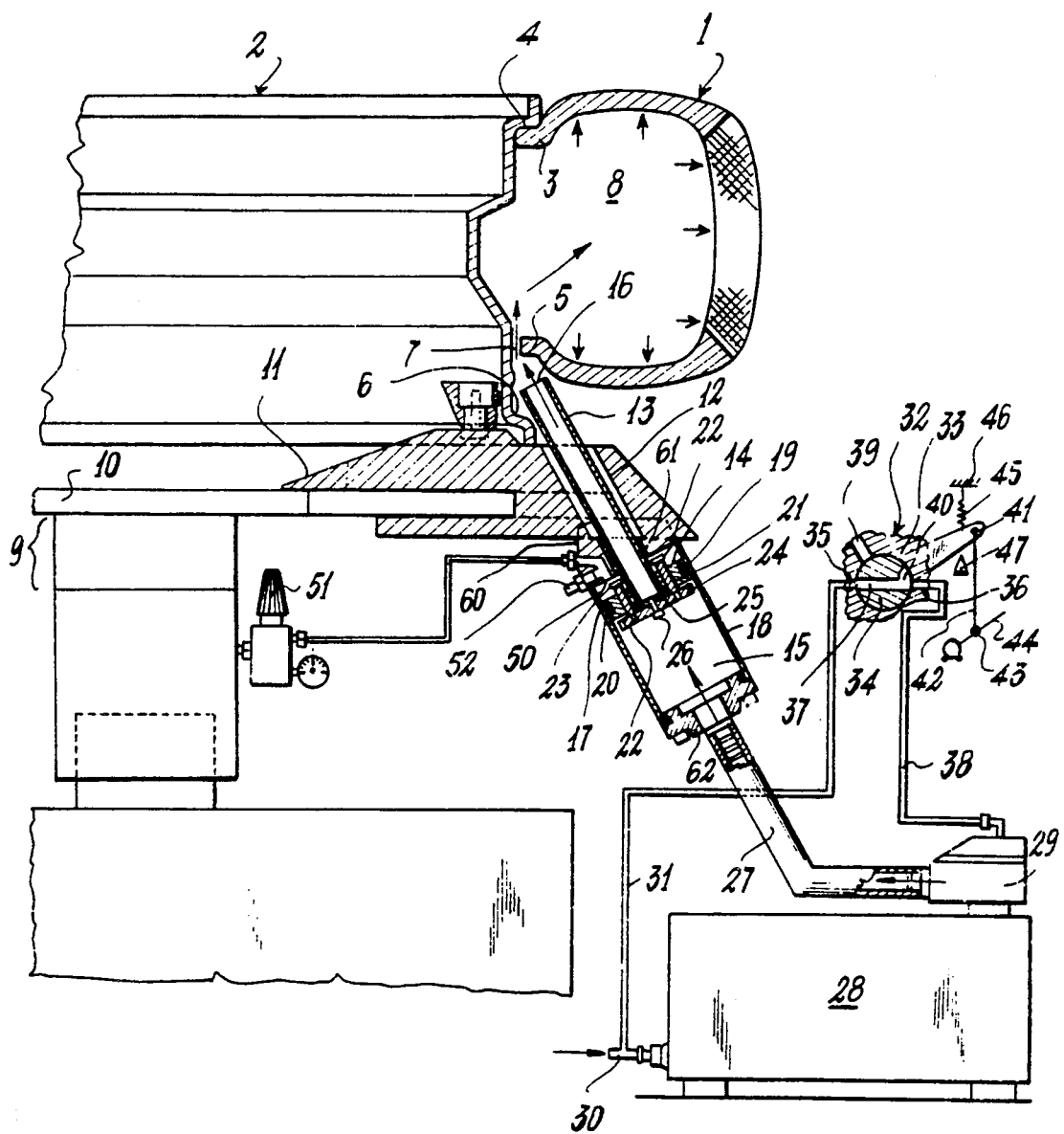

5,056,576

APPARATUS FOR QUICKLY POSITIONING A TUBE TIRE ON A CORRESPONDING WHEEL RIM

BACKGROUND OF THE INVENTION

This invention relates to an apparatus for positioning a tubeless tire on a corresponding wheel rim, i.e. on apparatus which enables the tire beads to be brought into sealed engagement with the wheel rim sides on inflating the tire. Apparatuses of the aforesaid type are already known. However, such devices have various drawbacks. More specifically, they occupy considerable space and as such can hinder the movement of the normal equipment for mounting the tire onto and removing it from the wheel rim. In addition they are not always adaptable to any tire size, and even when they are adaptable the procedure involved requires considerable time.

A further drawback of devices of the known art is that they have a considerable air consumption which negatively increases the cost of mounting the tire onto the wheel rim. Additionally some known devices are of complicated construction and use.

SUMMARY OF THE INVENTION

An object of the present invention is to provide an apparatus of the aforesaid type which is of simple construction and operation, which during use does not hinder the movement of the usual equipment for mounting the tire onto or removing it from the wheel rim, and which is also useable with tires of very different sizes.

A further object is to provide an apparatus of the aforesaid type which uses a predetermined but not excessive quantity of air.

Yet another object is to provide an apparatus which allows an operator considerable freedom of movement during the use of the device.

These and further objects which will be apparent to one skilled in the art are attained by an apparatus of the aforesaid type, comprising a retractable nozzle associated with a valve member mobile in a substantially cylindrical chamber under the action of compressed air and against another predetermined pressure lower than the air pressure which causes its movement, this valve member opening at the end of its movement in the chamber to enable the air to reach the nozzle, the cylindrical chamber being connected to a vessel containing a predetermined quantity of air at the higher pressure, and between said chamber and the vessel there being provided valve means preferably operated by a pedal.

BRIEF DESCRIPTION OF THE DRAWING

The present invention will be more apparent from the accompanying drawing, which shows a preferred embodiment and in which the single FIGURE is a schematic representation, with some parts shown in section for greater clarity, of the device according to the invention.

DESCRIPTION OF THE PREFERRED EMBODIMENT

The FIGURE shows in section a tubeless tire 1 mounted on a wheel rim 2.

The tire 1, which has just been mounted on the rim 2, does not as yet adhere tightly via its beads 3, 5 to the corresponding edges 4, 6 of the wheel rim. The wheel rim 2 is installed on a known machine 9 for mounting or removing the tire 1 on or from the wheel rim 2. In this example the machine comprises a table 10 on which at least three slidingly adjustable engagement means or clamps 11 are provided (of which only one is visible in the figure) for firmly retaining the wheel rim 2 while the tire 1 is being mounted on it.

One of the clamps 11 comprises a through hole 12 inclined towards the outer edge of the wheel rim and in which a nozzle 13 can slide. This nozzle is fixedly attached to a piston 14 mobile in a chamber 15 of a cylinder 18 fixed to the clamp 11 by a bracket-shaped extension 60. The nozzle comprises two opposing open ends 16 and 17 and passes in a sealed manner through a tubular appendix 61 of the cylinder 18. More specifically, the end 16 of the nozzle 13 is arranged to assume an operating position—which is that shown in the figure,—corresponding with a space 7 which forms between the lower bead 5 of the tire 1 and the edge 6 of the wheel rim 2.

The piston 14 embraces the inner end 17 of the nozzle 13, these parts being rigidly fixed together in any known manner. In its outer surface, the piston 14 comprises an annular seat containing a usual gasket 20.

The piston 14 also comprises two or more through holes 21 in which through pins 22 having at one end an enlarged head 23 are slidable. Their other end is fixed to a plate 24 which is also mobile within the cylindrical chamber 15, but is of smaller diameter than the piston. This plate carries a central gasket 25 arranged to close the end 17 of the nozzle 13. This gasket is fixed to the plate 24 for example by a screw 26. The plate 24 therefore acts as a shut-off valve for the nozzle 13.

At the end distant from the clamp 11 the cylinder 18 is connected to a vessel 28 via a pipe 27. Where this pipe enters the vessel there is provided a known quick discharge valve 29. More specifically, the vessel contains a predetermined air quantity (for example 150 liters) which is maintained at a high pressure (for example 10 or 15 bars). This compressed air is fed to the vessel via an inlet 30, for example by a normal compressor. A control valve 32 (shown schematically by way of example) is also connected via a pipe 31 to the inlet 30. This valve comprises a body 33 containing a rotatable valving element 34. This body comprises channels 35 and 36 able to connect a channel 37 of the valving element to the pipe 31 and to a further pipe 38. This latter connects the control valve 32 to the quick discharge valve 29.

The body 33 of the valve 32 also comprises a further channel 39 inclined to the other two channels 35 and 36 provided in said body.

The channel 37 of the valving element has one end widened at 40, and is configured as explained hereinafter.

The valving element 34 is associated with one end of an arm 41, the free end of which is fixed to a tie rod 42 pivoted at 43 to a pedal 44. This arm 41 is also subjected to the action of a spring 45 fixed to a stationary part 46. A limit stop 47 is provided for the movement of the arm 41. The cylinder is connected, at that end 50 towards which the piston 14 moves, to a pressure controller 51 which provides an air flow to the cylinder at constant pressure (for example 5 bars). This pressure acts against the higher pressure which drives said piston 14 (and which thus moves the nozzle 13 towards the tire 1). Finally, a pressure relief valve 52 discharges the air when the piston 14 moves towards the end 50, and thus, when the pressure set by the controller 51 is exceeded.

The valve 52 is of known type and remains closed when a pressure acts on it (in this case the pressure which reaches it from the pipe 31) and opens when this pressure is lacking.

It will now be assumed that both beads 3 and 5 of the tire 1 are to be brought into contact with the corresponding edges 4 and 6 of the wheel rim 2.

The vessel 28 is full of compressed air. The quick discharge valve 29 is closed because a pressure acts on it via the pipe 31, the control valve 32 and the pipe 38. The piston is at its lower end-of-travel position in contact with the end 62 of the cylinder 18 (and thus not in the operating position shown in the Figure).

If the pedal 44 is now pressed, the arm 41 moves to rotate the valving element 34 of the valve 32. This rotation interrupts the connection between the pipes 31 and 38 but causes this latter to communicate with the channel 39, which is connected for example to atmosphere. This communication takes place via the valving element channel 37, now coaxial to the channel 39, and via the enlarged end 40 of said channel 37.

As pressure is now lacking in the pipe 38, the quick discharge valve 29 opens and the air passes violently from said vessel and into the pipe 27 to reach the cylinder 18. In this cylinder the air acts on the valve plate 24, which moves towards the piston 14. In this manner the gasket 25 of the valve 24 closes against the end 17 of the nozzle 13. The pressure moves the plate 24, the piston 14 and the nozzle 13 towards the other end 50 of the cylinder 18. This movement continues until the heads 23 of the pins 22 collide against said end 50. At this point the movement of the valve 24 ceases, whereas the piston (still subjected to the pressure of the air passing around the sides of the plate 24, the cross-section of which is less than that of the chamber 15) continues to move by sliding along said pins to position the nozzle 13 above the edge 6 of the wheel rim by locally moving the tire bead 5.

As the gasket 25 of the plate 24 has separated from the end 17 of the nozzle, the compressed air discharges violently between the tire 1 and wheel rim 2. The air passes into the chamber 8 of said tire via the space or gap 7.

Because of the high pressure of the air which discharges into the chamber 8 and the fact that this discharge occurs substantially instantaneously, the tire inflates to bring its bead 3 into sealed contact with the edge 4 of the wheel rim 2. The same happens for that part of the other bead 5 located to the sides of the point 7 at which the nozzle 13 is situated. However, the point 7 also seals against the relative edge 6 (by the effect of the pressure in the chamber 8) when the nozzle 13 retracts into the hole 12, this retraction occurring as follows.

When the compressed air has been discharged into the tire and the valve 29 closed (by the operator releasing the pedal 44 to allow the pressure to act against the valve 29 via the pipe 38, which is now connected to the pipe 31), the piston 14 is no longer subjected to a thrust towards the end 50 of the cylinder 18. Compressed air is however present at this end from the controller 51, and this acts on said piston 14 to move it towards the end 62.

As a result of this movement, the nozzle 13 retracts into the hole 12 in the clamp 11, to thus enable the wheel rim 2 plus the assembled tire 1 to be removed from the table 10 of the machine 9 (in the usual manner).

A device formed according to the invention is of simple construction and use and results in minimum loss of tire inflation air. In addition the device can be used with any type of tubeless tire of any size. Finally, the device does not hinder the operation of the usual mechanisms for removing types from and mounting them on the wheel rim.

I claim:

1. An apparatus for quickly positioning a tubeless tire on a corresponding wheel rim, said apparatus comprising:

a mounting device for supporting a wheel rim during mounting of a tubeless tire onto a wheel rim, said mounting device including clampling means for firmly retaining said wheel rim on said device when mounting said tire on said wheel rim, said clamping means including a retractable inflation nozzle;

a cylinder including a piston fixedly attached to said nozzle;

a valve member, said valve member and said piston being movable within said cylinder;

means for supplying pressurized air to move said valve member and said piston within said cylinder in a first direction;

means for supplying air at a constant pressure to oppose movement of said valve member and said piston within said cylinder in said first direction;

said valve member opening at the end of its movement in the chamber to enable said pressurized air to reach said nozzle; and control valve means for discharging air through said nozzle;

said nozzle having an end adapted to extend from said clamping device into an operating position between a bead of the tire and an edge of the wheel rim when said piston moves in said first direction in order to supply the pressurized air into an interior of the tire.

2. The apparatus of claim 1, further comprising a pedal for operating said control valve means.

3. The apparatus of claim 1, wherein said means for supplying pressurized air is a vessel connected to said cylinder and capable of supplying air at a higher pressure than said constant pressure.

4. The apparatus of claim 1, wherein said control valve means comprises a quick discharge valve, a pipe to which said quick discharge valve is connected and which connects said vessel to said cylinder, and a valve for pneumatically controlling said discharge valve.

5. The apparatus of claim 1, further comprising a pressure relief valve attached to said cylinder and a pressure control valve and wherein said means for supplying air at a constant pressure comprises a compressed air source connected to said cylinder through said pressure control valve.

6. The apparatus of claim 1, wherein said valve member comprises a shut-off element which is movable relative to said piston and includes a plate, a gasket attached to said plate and cooperating with said nozzle, and a plurality of guide pins mounted within and slidable within said piston.

* * * * *